3,182,013
ACTIVATION OF ISOMERIZATION AND
HYDROCRACKING CATALYSTS
John W. Myers, Bartlesville, Okla., assignor to Phillips Petroleum Company, a corporation of Delaware
No Drawing. Filed Mar. 5, 1962, Ser. No. 177,681
19 Claims. (Cl. 208—112)

This invention relates to a process for improving the activity of catalysts consisting essentially of cobalt, nickel, cobalt molybdate, and nickel molybdate deposited on an alumina-containing support to increase their capacity for isomerizing and hydrocracking hydrocarbons, and to the isomerization and the hydrocracking of hydrocarbons utilizing the improved catalyst.

In recent years, the compression ratio of automobile engines has been raised to a level such that motor fuels of relatively high octane rating have become necessary. In fact, present-day automotive fuels are almost comparable in octane number to aviation gasolines of ten years ago. As a consequence of this rise in octane number, many new processes have been introduced in refineries for the production of such high grade fuels and include, for example, alkylation, catalytic reforming, catalytic cracking, and the like. In connection with such processes, particularly alkylation, a source of isoparaffins is necessary. Thus, it has become necessary to provide new processes for the production of isoparaffins, since natural sources of these materials are insufficient to supply present-day needs. The most widely used method for the preparation of isoparaffins comprises iosmerization of normal paraffins to isoparaffins. Hydrocracking of heavier hydrocarbons to produce lighter hydrocarbons suitable for motor fuel stocks is also practiced by the petroleum industry.

The most widely used isomerization catalysts are Friedel-Crafts catalysts of which the preferred one is aluminum chloride. However, other catalysts have been developed and are used in certain instances.

Isomerization and hydrocracking of hydrocarbons over nickel, cobalt, nickel molybdate, and cobalt molybdate deposited on alumina-containing supports has been practiced. This invention is concerned with a process for increasing the activity of these catalysts in such processes.

Accordingly, a principal object of the invention is to provide a process for improving the activity of a catalyst consisting essentially of nickel, cobalt, nickel molybdate, and/or cobalt molybdate deposited on a porous alumina-containing support. Another object is to provide an improved isomerization process using said catalyst. A further object is to provide an improved process for hydrocracking hydrocarbons utilizing said catalyst. Other objects of the invention will become apparent upon consideration of the accompanying disclosure.

A broad aspect of the invention comprises heating a catalyst consisting essentially of a porous alumina-containing support having deposited thereon at least one member of the group consisting of nickel, cobalt, nickel molybdate, and cobalt molybdate at a temperature in the range of 900 to 1500° F. for a period in the range of 10 minutes to 24 hours in an ambient including a substantial and activating concentration of at least one gas selected from the group consisting of anhydrous HCl, Cl, HBr, Br, and the Cl and Br derivatives of methane. The methane derivatives include mono-, di-, tri-, and tetrachloro- or -bromomethane. The alumina-containing support includes gamma or eta alumina, alumina-silica, silica-alumina, alumina-boria, silica-alumin-magnesia, etc. These supports may be fluorinated.

Method of making these catalysts are well known in the prior art and include both impregnation and precipitation methods. The catalyst to be activated by the method of the invention must be moisture-free. The activation treatment is preferably effected after the catalyst has been dried and calcined at an elevated temperature, preferably above 900° F., followed by reduction or treatment in hydrogen at similar temperatures. The catalysts are then treated with a stream of gas comprising one or a mixture of the halogen-containing gases previously named for a period of 10 minutes to 24 hours, preferably one-half to 6 hours. The treating agent can be used alone or along with a carrier gas such as hydrogen, nitrogen, methane, ethane, etc., hydrogen being particularly desirable. The pressure during the treatment is not critical, atmospheric or a conveniently higher pressure being suitable. Following this treatment, volatile halides such as $AlCl_3$ or $AlBr_3$ can be added to the catalyst by contacting the catalyst with vaporized halide. This is especially desirable when the catalyst is to be used for isomerization.

The catalyst after treatment by the process of the present invention is particularly useful in isomerization and hydrocracking processes. The isomerization process is ordinarily applied to $C_4$-$C_8$ hydrocarbons and the hydrocracking process to hydrocarbons above the gasoline boiling range, but this is only because butane and gasoline boiling range materials are generally more valuable than those boiling higher or lower.

In utilizing the catalysts of this invention for the isomerization of the foregoing hydrocarbons, the hydrocarbons to be isomerized are contacted with these new catalysts at a temperature in the range of 200 to 600° F., preferably, in the range of 250 to 450° F., in the presence of free hydrogen. The hydrogen-hydrocarbon mol ratios used during isomerization are within the range of 0.25 to 10.0, although it is not essential to use hydrogen. Liquid hourly space velocities of from 0.25 to 10.0 are very satisfactory. Pressures in the isomerization zone are within the range of 50 to 1500 p.s.i.g. It is to be understood that the catalysts of this invention of lower activity, that is, those which were treated with the treating agents at a temperature in the lower part of the temperature range of 900–1500° F., will be utilized at higher isomerization temperatures than those of higher activity (treated at higher temperatures in said range), and vice versa.

Maintenance of catalyst activity during use in the isomerization process is aided by inclusion of 0.001 to about 1 weight percent chloride in the feed in the form of chlorinated hydrocarbons such as carbon tetrachloride, chloroform, ethyl chloride, isopropyl chloride, etc. This is not a substitute for the activation of the present invention, but aids in maintaining over longer process periods the high level of catalyst activity produced by the present invention.

In utilizing the catalyst of this invention for hydrocarbon isomerization, the isomerization can be carried out either batchwise or continuous, preferably the latter. In carrying out the process as a continuous one, it is to be understood that hydrogen in the effluent product can be separated and recycled, and that recycling of isomerization promoters such as hydrogen chloride (introduced via feed) can be employed.

The activated catalysts of the invention are particularly applicable to the hydrocracking of $C_{10}$ to $C_{25}$ hydrocarbons. The hydrocracking is usually conducted at temperatures above the optimum isomerization temperature and in the range of 40 to 750° F. and in admixture with hydrogen. Conventional hydrocracking conditions are operative with these activated catalysts.

The following specific examples are intended to illustrate the advantages of the previously described catalysts of this invention, but it is not intended that the invention be unduly limited thereby.

EXAMPLE I

Catalyst A was prepared by impregnating active alumina with ammonium molybdate and cobalt nitrate, drying, calcining and then heating in a mixture of HCl and $H_2$ at 1200° F.

Catalyst B was prepared in a similar manner except the treatment with $H_2$ and HCl was at 900° F.

Catalyst C was prepared by heating active alumina in a mixture of $N_2$ and HCl at 1200° F.

These catalysts were then used to hydrocrack cetane. The results are set forth in Table I.

*Table I*

| Catalyst | A | B | C | |
|---|---|---|---|---|
| Temperature of HCl treatment | 1,200 | 900 | 1,200 | |
| Hydrocracking temperature, °F | 502 | 503 | 408 | 562 |
| Pressure, p.s.i.g | 500 | 500 | 500 | 500 |
| LHSV | 1.05 | 1.06 | 1.04 | 1.01 |
| $H_2$/cetane, mol ratio | 7.5 | 7.4 | 7.6 | 7.8 |
| Product composition, wt. percent: | | | | |
| $C_1$–$C_3$ | 0.9 | 0.2 | | |
| $C_4$'s | 8.5 | 5.6 | | |
| $C_5$–400° F | 17.5 | 17.4 | 0.4 | 0.6 |
| Above 400° F | 73.1 | 76.8 | 99.6 | 99.4 |
| Total | 100.0 | 100.0 | 100.0 | 100.0 |

These data show the cobalt-molybdate containing catalyst treated at 1200° F. to be a little more active than the one treated at 900° F. The data also show the catalysts containing cobalt-molybdate to be much more active than the one without the cobalt molybdate promoter.

EXAMPLE II

Catalyst D was prepared in a manner similar to Catalyst A of Example I except that the step of heating in a mixture of $H_2$ and HCl was omitted.

Catalyst A of Example I and Catalyst D were then used to hydrocrack cetane. The conditions and results of the runs are set forth in Table II.

*Table II*

| Catalyst | A | | D | |
|---|---|---|---|---|
| Hydrocracking temperature, °F | 502 | 588 | 504 | 605 |
| Pressure, p.s.i.g | 500 | 500 | 500 | 500 |
| LHSV | 1.05 | 1.07 | 1.03 | 1.01 |
| $H_2$/cetane, mol ratio | 7.5 | 7.4 | 7.6 | 7.7 |
| Product composition, wt. percent: | | | | |
| $C_1$–$C_3$ | 0.9 | 2.8 | 0.4 | 0.9 |
| $C_4$'s | 8.5 | 13.0 | 0.2 | 0.4 |
| $C_5$–400 °F | 17.5 | 36.6 | 1.1 | 4.5 |
| 400–500° F | 1.7 | 1.4 | 1.2 | 3.9 |
| About 500° F | 71.4 | 46.2 | 97.1 | 90.3 |
| Total | 100.0 | 100.0 | 100.0 | 100.0 |

EXAMPLE III

The nickel-alumina base catalyst was prepared and HCl-treated in the manner described below.

A nickel nitrate impregnating solution was prepared by dissolving 28.2 grams of nickel nitrate in distilled water and adding sufficient water to bring the volume to 77 ml. This solution was slowly added to 200 cc. of eta alumina pills while stirring and all of the solution was adsorbed by the pills. The impregnated pills were dried at about 214° F. and calcined by heating to a final temperature of 1000° F. The nickel added was sufficient to give 3.6 weight percent nickel in the calcined catalyst.

A portion of the nickel-containing base was placed in a quartz tube in a 220° F. muffle with $H_2$ flowing through the tube. The temperature was raised to 600° F. and maintained at 600° F. for about one hour. Then the temperature was increased to 1200° F. and maintained at 1200° F. for about two hours. Then anhydrous HCl was started with the $H_2$ and continued for about 3.1 hours and the container was removed from the muffle. The HCl was stopped two minutes before removing the tube from the muffle and the hydrogen was continued until the catalyst was cool.

This catalyst was then used to hydrocrack cetane. The conditions and data obtained in the runs are set forth in Table III.

*Table III*

| Run Number | 1 | 2 |
|---|---|---|
| Length of run, hours | 3 | 3 |
| Temperature, °F | 403 | 502 |
| Pressure, p.s.i.g | 500 | 500 |
| LHSV | 1.0 | 1.0 |
| $H_2$/HC, mol ratio | 8.1 | 7.6 |
| Product composition, wt. percent: | | |
| Propane | 0.1 | 0.7 |
| Isobutane | 1.7 | 4.7 |
| n-Butane | 0.7 | 0.4 |
| Isopentane | 1.4 | 3.0 |
| N-pentane | 0.0 | 0.2 |
| $C_6$–400° F | 4.0 | 9.3 |
| 400–500° F | 1.2 | 1.7 |
| Above 500° F | 90.9 | 80.0 |
| Total | 100.0 | 100.0 |

The foregoing examples illustrate the isomerizing and hydrocracking activities of the catalysts described and the effectiveness of the activating treatment of the invention.

Certain modifications of the invention will become apparent to those skilled in the art and the illustrative details disclosed are not to be construed as imposing unnecessary limitations on the invention.

I claim:

1. A process for activating a moisture-free catalyst consisting essentially of a porous substantially water-free activated alumina-containing support calcined at a temperature above 900° F. having deposited thereon at least one member of the group consisting of nickel, cobalt, nickel molybdate, and cobalt molybdate, which comprises heating said catalyst at a temperature in the range of 900 to 1500° F. for a period in the range of 10 minutes to 24 hours in an anhydrous, vaporous ambient including a substantial and activating concentration of at least one gas selected from the group consisting of HCl, Cl, HBr, Br, and the Cl and Br derivatives of methane.

2. The process of claim 1 wherein the heating period is at least 0.5 hour.

3. The process of claim 1 wherein said catalyst is heated in an anhydrous $H_2$ ambient at a temperature in the range of 900 to 1500° F. prior to the activation step.

4. The process of claim 1 wherein the activating agent includes HCl.

5. The process of claim 1 wherein the activating agent is admixed with $H_2$ and the activated catalyst is cooled in $H_2$.

6. The process of claim 1 wherein cobalt molybdate deposited on activated alumina is activated with HCl for at least 0.5 hour.

7. The process of claim 1 wherein nickel deposited on activated alumina is activated with HCl for at least 0.5 hour.

8. A catalyst consisting essentially of a porous activated alumina-containing support having deposited thereon at least one member of the group consisting of nickel, cobalt, nickel molybdate, and cobalt molybdate activated by the process of claim 1.

9. A catalyst of claim 8 wherein said support consists essentially of active alumina and said member is cobalt molybdate.

10. A catalyst of claim 8 wherein said support consists essentially of active alumina and said member is nickel.

11. A process for isomerizing an isomerizable hydrocarbon which comprises contacting at least one said hydrocarbon under anhydrous isomerizing conditions including a temperature in the range of 200 to 600° F., a pressure in the range of 50 to 1500 p.s.i.g., and a liquid hourly space velocity in the range of 0.25 to 10.0 liquid volumes per volume of catalyst per hour with a catalyst activated by the process of claim 1.

12. The process of claim 11 wherein said hydrocarbon comprises at least one $C_4$–$C_8$ hydrocarbon.

13. A process for hydrocracking a hydrocrackable hydrocarbon which comprises contacting said hydrocarbon in admixture with $H_2$ under anhydrous hydrocracking conditions including a temperature in the range of 400 to 750° F. with a catalyst activated by the process of claim 1.

14. The process of claim 13 wherein said catalyst consists essentially of cobalt molybdate on activated alumina.

15. The process of claim 14 wherein said catalyst consists essentially of nickel on activated alumina.

16. A process for activating a moisture-free catalyst consisting essentially of a porous activated alumina support rendered substantially water-free by calcination at a temperature of at least 900° F. and having deposited thereon at least one member of the group consisting of nickel, cobalt, nickel molybdate, and cobalt molybdate, which comprises heating said catalyst at a temperature in the range of 900 to 1500° F. for a period in the range of 10 minutes to 24 hours in an anhydrous, vaporous ambient including a substantial and activating concentration of at least one gas selected from the group consisting of HCl, Cl, HBr, Br, and the Cl and Br derivatives of methane.

17. A catalyst consisting essentially of a porous activated alumina support having deposited thereon at least one member of the group consisting of nickel, cobalt, nickel molybdate, and cobalt molybdate activated by the process of claim 16.

18. A process for isomerizing an isomerizable hydrocarbon which comprises contacting at least one said hydrocarbon under anhydrous isomerizing conditions including a temperature in the range of 200 to 600° F., a pressure in the range of 50 to 1500 p.s.i.g., and a liquid hourly space velocity in the range of 0.25 to 10.0 liquid volumes per volume of catalyst per hour with a catalyst activated by the process of claim 16.

19. A process for hydrocracking a hydrocrackable hydrocarbon which comprises contacting said hydrocarbon in admixture with $H_2$ under anhydrous hydrocracking conditions including a temperature in the range of 400 to 750° F. with a catalyst activated by the process of claim 16.

References Cited by the Examiner

UNITED STATES PATENTS

| | | | |
|---|---|---|---|
| 2,939,897 | 6/60 | Beber et al. | 260—683.68 |
| 2,963,527 | 12/60 | Johnson et al. | 260—683.68 |
| 2,985,582 | 5/61 | Oettinger | 208—108 |
| 3,024,294 | 3/62 | Geerts et al. | 260—683.68 |
| 3,058,906 | 10/62 | Stine et al. | 208—110 |
| 3,078,238 | 2/63 | Beuther et al. | 208—264 |

ALPHONSO D. SULLIVAN, *Primary Examiner.*